US009652161B2

(12) United States Patent
Mehra (10) Patent No.: US 9,652,161 B2
(45) Date of Patent: May 16, 2017

(54) SYSTEM, METHOD, AND MEDIUM OF OPTIMIZING LOAD REALLOCATION IN AN IN-MEMORY DATA MANAGEMENT GRID

(71) Applicant: Software AG USA Inc., Reston, VA (US)

(72) Inventor: Gagan Mehra, Oakland, CA (US)

(73) Assignee: Software AG USA Inc., Reston, VA (US)

( * ) Notice: Subject to any disclaimer, the term of this patent is extended or adjusted under 35 U.S.C. 154(b) by 73 days.

(21) Appl. No.: 14/571,518

(22) Filed: Dec. 16, 2014

(65) Prior Publication Data
US 2016/0170668 A1  Jun. 16, 2016

(51) Int. Cl.
*G06F 12/10* (2016.01)
*G06F 3/06* (2006.01)
*G06F 9/50* (2006.01)

(52) U.S. Cl.
CPC ............ *G06F 3/0619* (2013.01); *G06F 3/067* (2013.01); *G06F 3/0647* (2013.01); *G06F 9/5088* (2013.01)

(58) Field of Classification Search
CPC ....... G06F 3/0619; G06F 9/5088; G06F 3/067

USPC ......................................................... 711/165
See application file for complete search history.

(56) References Cited

U.S. PATENT DOCUMENTS

| 8,769,238 | B1 | 7/2014 | Sivasubramanian et al. |
| 2003/0140198 | A1* | 7/2003 | Ninose ............... G06F 12/0804 711/122 |
| 2012/0136835 | A1 | 5/2012 | Kosuru et al. |

* cited by examiner

*Primary Examiner* — Jae Yu
(74) *Attorney, Agent, or Firm* — Posz Law Group, PLC (57) ABSTRACT

An in-memory data management (IMDM) system is described that includes an IMDM cluster, a load balancer, and a reallocation processor controller. The IMDM cluster includes a plurality of nodes. The controller determines whether there is an actionable load imbalance of existing data elements, stored among the plurality of nodes, based on a predefined criteria or rule. The controller further identifies a source node from which at least one data element is to be deleted and a target node to which the at least one data element that is to be deleted is to be added. The source node and target node contribute to the actionable load imbalance. The controller copies the at least one data element that is to be deleted from the source node into the target node, and deletes the at least one data element that is to be deleted from the source node.

20 Claims, 6 Drawing Sheets

SYSTEM, METHOD, AND MEDIUM OF OPTIMIZING LOAD REALLOCATION IN AN IN-MEMORY DATA MANAGEMENT GRID

TECHNICAL FIELD

The technical field relates in general to in-memory data management (IMDM) systems, and more particularly to load reallocation for IMDMs.

BACKGROUND

Conventionally, IMDM systems employ a load-balancing algorithm (via a load balancer) that allocates data across different nodes in a clustered environment. However, since data is maintained in-memory, over a certain period of time there will eventually be an uneven distribution of data as data elements are deleted or expire on their own. The period of time over which the uneven distributions occur may be a few seconds or a few days.

In conventional IMDM systems, the load balancer distributes data by identifying the least-loaded node in a cluster. Succinctly put however, the load balancer does not aid in redistributing total load by reallocating data on then-existing nodes. As a result of this situation, some nodes in a cluster run slower than others as the slower running nodes are loaded with more data compared to the other nodes in the cluster.

Another issue that arises in conventional IMDM systems is that the load balancer queues requests sent to the heavily loaded nodes. This clearly impacts the quality of service, and may even result in financial penalties if service level contracts are violated. The embodiments disclosed herein resolve the issues in conventional IMDM systems using an optimized reallocation process, which provides clustered nodes with approximately equal data loads.

SUMMARY

Accordingly, one or more embodiments provide a method, computer device and/or non-transitory computer readable medium that optimizes load reallocation in an in-memory data management (IMDM) system. The method is implemented in IMDM system that may include an IMDM cluster including a plurality of nodes, a load balancer, and a reallocation process controller, cooperatively operable with the IMDM cluster and the load balancer. The method comprises performing a reallocation cycle including determining, by the reallocation process controller, whether there is an actionable load imbalance of existing data elements, stored among the plurality of nodes included in the IMDM cluster, based on a predefined criteria or rule.

When it is determined that there is an actionable load imbalance of existing data elements, several other steps of the reallocation cycle are performed. One additional step includes identifying, by the reallocation process controller, in the plurality of nodes, a source node, from which at least one data element is to be deleted, and a target node, into which the at least one data element that is to be deleted, is to be added. The source node and target node at least in-part contribute to the actionable load imbalance of existing data elements.

The reallocation cycle further includes copying, by the reallocation process controller, the at least one data element that is to be deleted from the source node into the target node. The reallocation cycle further includes deleting, by the reallocation process controller, the at least one data element that is to be deleted from the source node.

In another embodiment, the predefined criteria or rule used in determining whether there is an actionable load imbalance of existing data elements includes at least one of an amount of data used in the plurality of nodes, an expiration of time from a starting point, a number of data elements stored in the plurality of nodes, an occurrence of a node being added or removed from the IMDM cluster, an occurrence of a request from a client application that has been determined to be a trigger by a predictive-learning function, and an occurrence of a manual trigger.

In another embodiment, the source node is identified according to the predefined criteria or rule used to determine whether there is an actionable load imbalance of existing data elements, and the target node is identified based on its current load and total capacity obtained by the load balancer.

In another embodiment, the at least one data element includes only data elements with an auto-expiration date determined, in part by the load balancer, to be not imminent according to a predetermined standard for imminence.

In another embodiment, the at least one data element includes only data elements that are a least recently used data element or a least frequently used data element in their respective nodes.

In another embodiment, the method further comprises when, after the source node and the target node are identified but before the at least one data element is copied, the load balancer receives a write request from a client application: pausing operation of the reallocation process controller; executing the write request by the load balancer; and restarting performing the reallocation cycle.

In another embodiment, the method further comprises when, after the source node and the target node are identified and after the at least one data element is copied, the load balancer receives a request from a client application: pausing operation of the reallocation process controller; executing the request by the load balancer; and restarting performing the reallocation cycle.

It should be noted that also disclosed herein are a system and non-transitory, computer readable storage medium featuring the functionality immediately-above described.

One, or a combination of more than one, or all, of the above embodiments, can be combined and provided as a single embodiment.

It should also be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

In overview, the present disclosure concerns an improvement for an in-memory data grid, in which for example multiple nodes are triggered through a load-balancer, each node handles one or many unique data elements, and then some time after operation the number of data elements belonging to one or more nodes are not distributed evenly. More particularly, various inventive concepts and principles are embodied in systems, devices, and methods therein to identify and correct the imbalance situation, in which the imbalance situation is recognized, the appropriate nodes and data elements to reallocate the data elements/nodes are selected and then a reallocation of the data elements—which are re-assigned to another node—is performed, thereby to gain back performance deficiencies.

As further discussed herein, various inventive principles and combinations thereof are advantageously employed to identify an imbalanced node set, to identify which nodes and which elements shall be reallocated (which can use certain special care), and to perform the reallocation without affecting the general responsiveness of the whole system that uses the in-memory data grid.

The embodiments disclosed herein are used in an in-memory environment and aid in reallocating the load of different nodes based on a variety of factors. Reallocation as described herein may be contrasted with the load balancer conventionally used in an in-memory environment. Specifically, the conventional load balancer analyzes the load on each node prior to allocating additional load, whereas reallocation involves moving existing load among nodes based on several criteria. Reallocation of load for in-memory systems has become more important as in-memory systems have become more complicated with data being transient and non-persistent over longer time frames.

Optimized reallocation is required when an in-memory data management (IMDM) system has been running for an extended period. Although the nodes may have started out with roughly equal loads, eventually the nodes become unequal or varied. This results for a number of reasons, for example, from objects in memory expiring or being deleted. Additionally, larger objects may be added.

The herein disclosed optimized reallocation process may be based on many different parameters, such as load threshold, data threshold, change in number of nodes, etc. Reallocation of data on the nodes allows each node to continue to maintain a desired latency. The conventional load balancer's allocation system will simply not work unless reallocation eventually occurs. Reallocation will allow IMDM systems to avoid related performance issues when the system has been running continuously for a period of time.

II. State of the Art of the Technology

The prior art related to providing an equitable distribution of data does not specifically address reallocation of data in an in-memory system, which has unique problems. For example, U.S. Pat. No. 8,769,238 to Sivasubramanian et al. ("Sivasubramanian") discloses how data can be redistributed for any shared resource by restriping the data. However, Sivasubramanian does not focus on the data management aspects for an in-memory system. Rather, it focuses on restriping data and on a "shared resource." An in-memory system is mostly deployed in a dedicated setup.

Sivasubramanian is additionally designed to support different storage systems that are being used as a shared resource. Memory could also be used as a shared resource, e.g., the storage systems, but the memory would not be rebalanced based on the needs of an in-memory data management system. Moving data to balance out storage is a different problem than rebalancing a software system, using memory, during runtime.

Another prior art reference, U.S. Patent Application Publication No. 2012/0136835, which was filed by Kosuru et al. ("Kosuru") discloses a process for rebalancing data in a database. Again, distributing data in a database presents different challenges than reallocating load in an in-memory data management system. This is true whether the distributing of data is in a single database or over a network of interconnected databases.

There are several commercial in-memory vendors. However, these vendors have not focused on load reallocation or load balancing, and in particular load reallocation or load balancing in IMDM systems. Oracle Coherence, Hazelcast, IBM eXtremeScale, and Tibco ActiveSpaces are examples of in-memory vendors, which are conventional and do not include the features disclosed herein.

GridGain is an in-memory data fabric. The literature associated with this product describes that:

"Once jobs are scheduled and have arrived on the remote node for execution they get queued up on the remote node. How long this job will stay in the queue and when it's going to get executed is controlled by the collision SPI—that effectively defines the late load balancing stage.

One implementation of the load balancing orchestrations provided out-of-the-box is a job stealing algorithm. This detects imbalances at a late stage and sends jobs from busy nodes to the nodes that are considered free right before the actual execution."

In GridGain, the load balancing process moves jobs from nodes that are loaded to nodes with lighter loads. This is not the same as in-memory data management. Succinctly put, GridGain balances load by balancing where to run jobs versus optimized operation of a node itself by reallocating data across a cluster.

III. Disadvantages of the Closest Prior Art

There are products available that implement load balancing for an in-memory system. However as discussed herein in detail, available load balancing focuses on balancing initial load distribution rather than reallocation after an unevenness in load distribution occurs. The prior art also includes solutions where network traffic is rebalanced. However, reallocation of, for example, transient objects in-memory, such as disclosed herein, is much different.

IV. Concept

Figure 1:
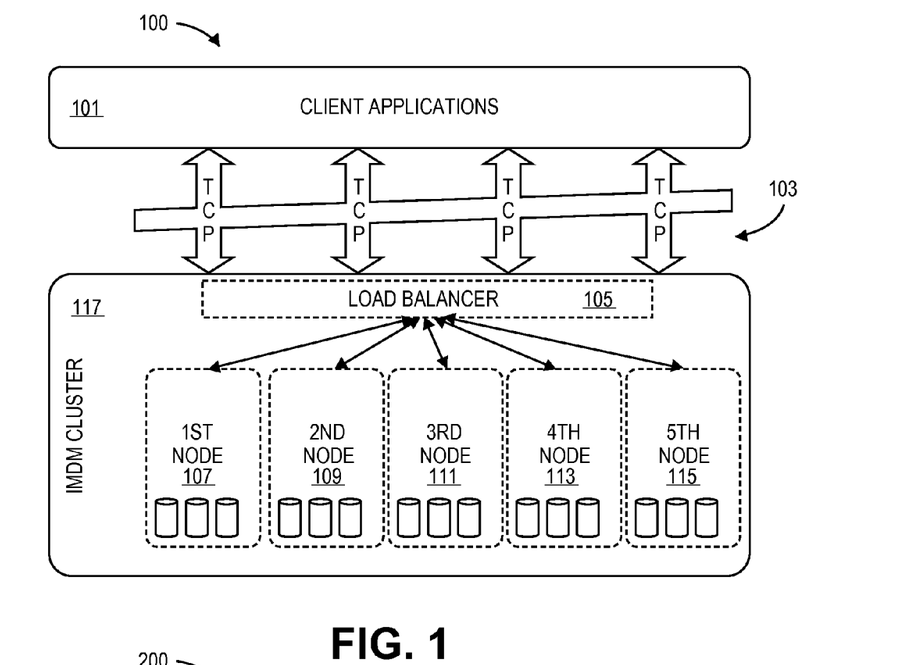
FIG. 1 is a diagram illustrating an initial state of load allocation in an in-memory data management (IMDM) system.
Figure 2:
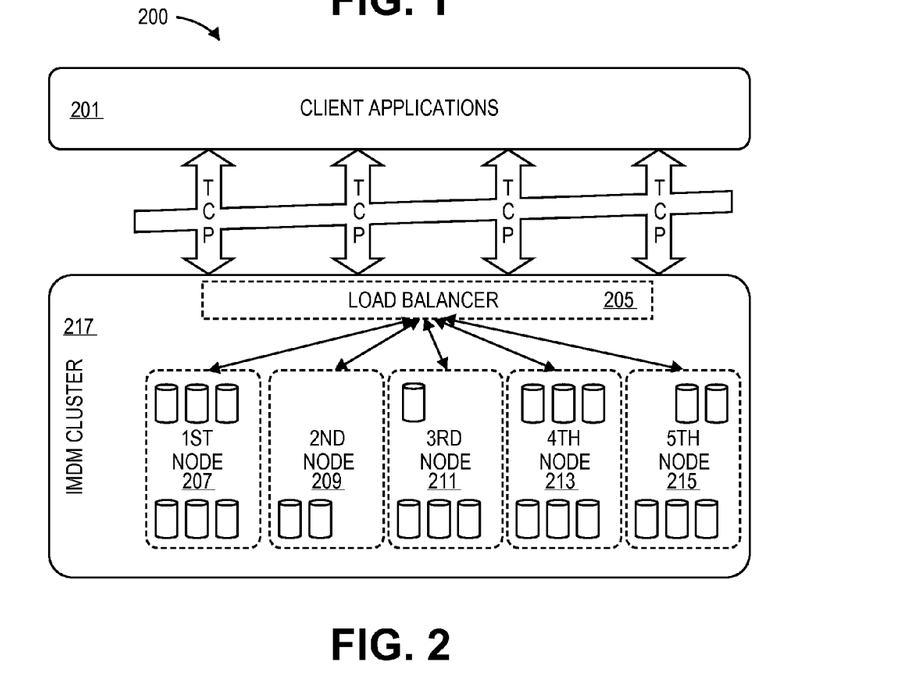
FIG. 2 is a diagram illustrating load allocation in an IMDM system after a time elapse.

As further discussed herein below, various inventive principles and combinations thereof are advantageously employed to optimize reallocation of node load in an IMDM system. As such, a reasonable and desired latency in accessing data elements in the IMDM system may be achieved. Turning then to FIG. 1, a diagram illustrating an initial state of load allocation in an IMDM, and FIG. 2, illustrating the state of load allocation of the IMDM of FIG. 1 after a lapse of time, are described.

A. Basic Setup

FIG. 1 illustrates an IMDM system 100 that includes client applications 101, TCP protocol communications 103, a load balancer 105, and an IMDM cluster 117 further including a first node 107, a second node 109, a third node 111, a fourth node 113, and a fifth node 115. In the IMDM system 100, the client applications 101 access the IMDM cluster 117 through TCP protocol communications 103. The two primary client application communications involve write commands and read commands. In processing a write command, data elements (illustrated in each node as cylinders) are provided with a unique ID (a "key") and are added to a node. In processing read commands, the data elements are accessed through their keys/IDs, but there are no additions or deletions. The load balancer 105, nodes 107-111, TCP protocol communications 103, and client applications 101 can be structured using known techniques.

In an initial state, the nodes 107, 109, 111, 113, 115 are pre-loaded with data elements represented by the cylinders. An assumption made is that the nodes 107, 109, 111, 113, 115 are evenly loaded prior to the load balancer 105 beginning communication. This is because some data has to be bulk loaded. Thus in FIG. 1, there are three data elements in each of the nodes 107, 109, 111, 113, 115 prior to communication by the load balancer 105.

Several client applications 101 communicate with the IMDM cluster 117, and all requests for data are channeled through the load balancer 105. For the sake of simplicity, FIG. 1 assumes that all data in the cluster belongs to a single cache and that each key is unique with no data duplication. It should be noted, however, that in actuality the entire IMDM system 100 may be implemented by one or more machines, either virtual or real, in one or more networks. That is to say, the architecture illustrated in FIG. 1 may be viewed generally as a logical architecture.

B. After Lapse of Time

Turning now to FIG. 2, a diagram illustrating load allocation in an IMDM system 200 after some time has lapsed is described. The IMDM system 200 is of the same basic structure as the IMDM system 100 in FIG. 1. As mentioned above, after a period of time has elapsed, the load on the nodes 207, 209, 211, 213, 215 in the IMDM cluster 217 is not as evenly balanced as in FIG. 1 as certain data elements (cylinders) are expired or deleted based on the client applications' 201 needs.

As seen in FIG. 2, the first node 207 and the fourth node 213 each have six data elements. The fifth node 215 has five data elements; the third node 211 has four data elements; and the second node has two data elements. Once an uneven distribution of data elements occurs among nodes 207, 209, 211, 213, 215 as seen in FIG. 2, requests from the client applications 201 that route to the first node 207 and the fourth node 213 will take longer to be processed than requests to the other four nodes because additional data elements must be searched. As well, the load balancer 201 might queue up the requests for the first node 207 and the fourth node 213 resulting in further degradation of the quality of service.

The inventors have observed that the load balancer 201 may have information reflecting the lack of balance of load on the nodes 207, 209, 211, 213, 215, but the load balancer 201 is not designed to reallocate the data elements on the nodes as it is dealing with the incoming requests from the client applications 201. In this regard it should be noted as discussed below that reallocation should not impact incoming requests from client applications 201 to the load balancer 205. Even so, reallocation can be done in order to simply avoid the load balancer 205 queuing up requests to read or write data from loaded nodes such as the first node 207 and the fourth node 213.

C. Reallocation

Figure 3:
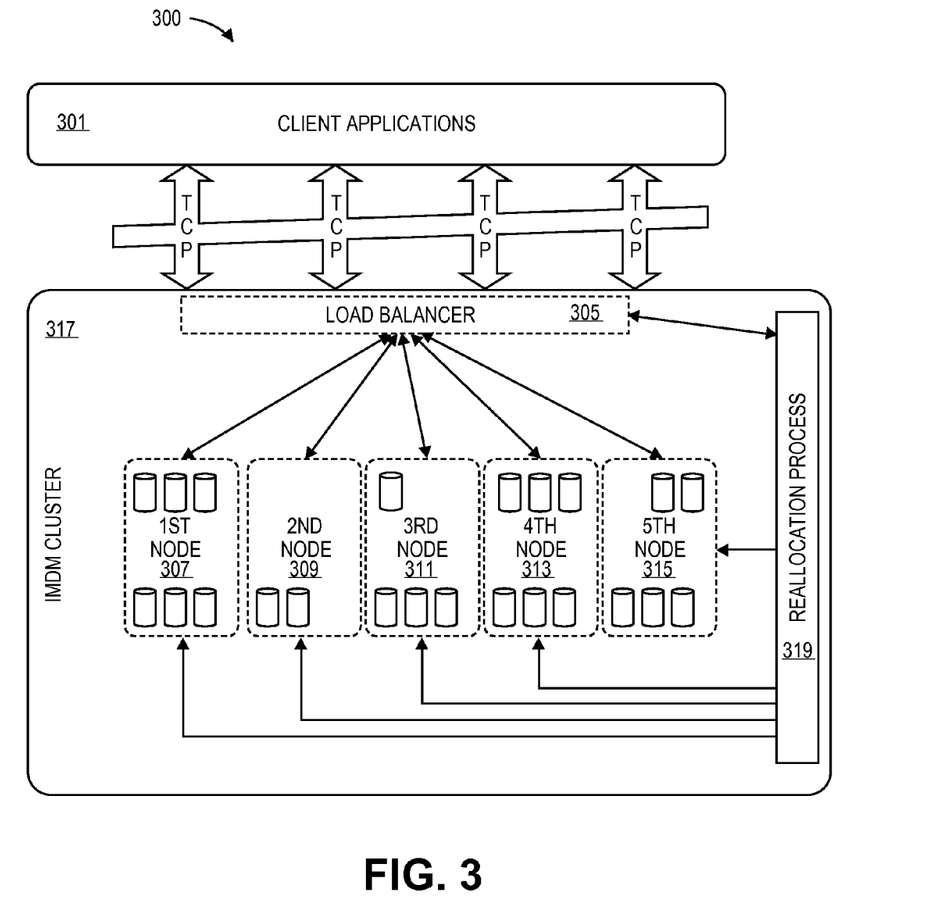
FIG. 3 is a diagram illustrating a reallocation process, as separate from a load balancer, in an IMDM system.

FIG. 3, which is a diagram illustrating a reallocation process, as separate from a load balancer, in an IMDM system 300 is now described. The IMDM system 300 includes the same basic structure as the IMDM system 200 in FIG. 2 and the IMDM system 100 in FIG. 1. In FIG. 3, the load on the nodes 307, 309, 311, 313, 315 in the IMDM cluster 317 is illustrated as unbalanced. However, the reallocation process 319 is provided and interacts with the load balancer 305 and the nodes 307, 309, 311, 313, 315 so as to allow reallocation without an impact on requests from the client applications 301.

The reallocation process 319 can use one or more techniques to allocate the data elements across the nodes 307, 309, 311, 313, 315. The optimized reallocation process 319 can be run as a background process on the IMDM cluster 319 that wakes up based on one or more criteria. As described above, when an unevenness in load occurs over time, the reallocation process 319 begins. It should be noted that the reallocation process does not begin at any unevenness, but only when there is an actionable load imbalance.

The exact criteria for when the reallocation process 319 is triggered are now described. One or more of the following may be used, or variations on the following:

1. Data Amount Threshold: Each node in the IMDM cluster 319 will have a setting related to the amount of data used in node that triggers reallocation. For example, when a node with 100 GB of total RAM is determined to have reached 80 GB of RAM in use, reallocation will be triggered. The data amount threshold setting may either be a node-level setting or a cluster-level setting.

2. Time Threshold: Each node in the IMDM cluster 319 will have a setting related to the amount of elapsed time that triggers reallocation. That is to say, the cluster 319 or an individual node nodes 307, 309, 311, 313, 315 can be setup to trigger reallocation after a certain period of time has expired. The time period could range from every few seconds or every few days depending on the need for reallocation in a specific environment. The time threshold may be a node-level setting or a cluster-level setting.

3. Number of Elements Threshold: Each node in the IMDM cluster 319 will have a setting related to the number of elements (illustrated as cylinders in FIGS. 1-3) used in a node that triggers reallocation. For example, reallocation may be triggered if the number of elements on a node exceeds a threshold such as 10,000. It should be clear that the number of elements threshold is different from the data amount threshold, as the number of elements threshold does not take into account the size of the data elements.

This difference can be quite important as a node could have only 10 GB of data, for example, but tens of thousands of small elements. As a result, many more client application requests may hit the low-data amount node with respect to other nodes of larger-data amounts. Such a scenario would certainly result in degradation of the quality of service. It should be noted that the number of elements threshold may be a node-level setting or a cluster-level setting.

4. Addition or Removal of a Node from the Cluster: This cluster-level setting automatically triggers the reallocation process 319 when a new node requires a load. Similarly, the reallocation process 319 is automatically triggered when a node is removed or has become non-functioning (has crashed). In the case of removal, the available capacity of the entire IMDM cluster 319 is decreased. Therefore the reallocation process 319 will review distribution of data in the nodes 307, 309, 311, 313, 315 in the cluster 319 in order to avoid impacting the quality of service.

5. Manual Trigger: The reallocation process 319 can be manually triggered from a management console used with the IMDM system 300. Typically, a system administrator will have privileges to manually trigger the reallocation process 319.

6. Predictive Reallocation: The reallocation process 319 is triggered through the use of predictive analytics that correlate historical data with current, real-time data. Predictive reallocation involves designing a model once, and optimizing the model over time depending on the data generated. The reallocation process 319 thus learns by reviewing patterns over a period of time.

For example, if after a certain request from a client application 301 the load on the nodes 307, 309, 311, 313, 315 increases, the reallocation process 319 anticipates that when the specific request is made again, reallocation will be necessary. It should thus be understood that two exactly similar deployments of the IMDM system 300 could have very different predictive models over a period of time as the users of the two systems act in different fashions with their requests. The benefit of predictive reallocation is that data elements can be reallocated without any thresholds being established. Succinctly put, the thresholds that improve the overall reallocation process are learned over a period of time.

D. Reallocation Process

The actual reallocation process itself can be viewed as including several steps.

(1) As described above, the initial step is first determining that there is an imbalanced set of in-memory nodes based on the defined rules and/or criteria above.

(2) The second step includes identifying the source and the target nodes for the reallocation.

(3) In the third step, the source nodes are identified based on the trigger criteria for the reallocation process and the target nodes are identified based on their current load and their total capacity. It is possible that a reallocation process is interrupted if the load balancer sends more data elements to a target node or deletes data elements that were being migrated from a source node. In such instances, the reallocation process will again identify source and target nodes (4) A fourth step in the reallocation process is identifying the actual data elements in the source node that are to be moved. This is certainly a non-trivial action. Data elements are created with auto-expiration and/or may be deleted based on least recent use or some other algorithm used in managing their life cycle.

For example, the reallocation process can be configured to ignore data elements that are expiring in the next ten seconds. The reallocation process would check the metadata of each data element to determine the expiry time of each data element. Time expiration of nodes can be managed in the reallocation process by a property called "IgnoreElementsWithExpiryTime." The value of this property can be maintained in seconds, for example, and can be accessed at the time the reallocation process is starting.

Additionally, the reallocation process may work with the load balancer to determine data elements that will be removed from memory using other cache algorithms. These algorithms determine which data elements may be discarded to effect a more even distribution of data elements in the nodes in a cluster. This may be particularly desirable where memory capacity is low. Two examples of such algorithms include the least recently used (LRU) algorithm mentioned above and the least frequently used (LFU) algorithm. It should certainly be understood that there are other cache algorithms known in the art that are not discussed herein, and the examples above should not be viewed as limiting. In implementing cache algorithms, the "NodeInfo" object may be obtained from the load balancer such that the Metadata associated with respective data elements can be retrieved.

At this stage, it can be generally stated that identifying data elements to be moved in reallocation includes:

(a) identifying the nodes requiring reallocation when a start threshold is met;

(b) obtaining a current state of source nodes identified for reallocation by interacting with the load balancer; and (c) identifying those data elements in source nodes that are about to expire or be discarded, for example according to another cache algorithm, in which case reallocation will not move those data elements soon to expire or be discarded.

(5) The reallocation process completes these steps to review all of the attributes, in order to identify correctly the data elements to be moved.

(6) Once the data elements that are to be reallocated are correctly identified, actual movement and/or change of ownership of a data element from a source node to a target node can be performed. Examples (1)-(4) are provided below.

The basic understanding of actual movement of data elements in the reallocation process is that client applications should not be impacted. Thus if a client application is impacted during reallocation, the reallocation process can be rolled back, preferably in its entirety. Thus the reallocation process may be fully completed with no impact on client applications, or the reallocation process can be restarted.

Given that the load state of an IMDM cluster changes quite frequently, the reallocation process can operate with the smallest data set possible at any given time. Moving small packages of data is a better approach, as it is important to reallocate data elements without interruptions. Since an in-memory system may be very dynamic, it is preferred to completely reallocate each one of different small packages, versus doing no reallocation because of continuous interruptions of larger packages. Normal processing of the in-memory system will typically not be impacted because the reallocation process can be established as being lower priority than the load balancer. Four scenarios (a) to (d) are now described as example explanations of the reallocation process.

(a) The Reallocation Process Runs without Interruption of New Requests from the Load Balancer This is the ideal scenario. The reallocation process starts and identifies the source and the target node for the data elements that need to be reallocated. The reallocation process is completed without getting interrupted by any new requests from the load balancer. If new requests from the load balancer are received, the reallocation process will give priority to the new request and stop current activity as shown in subsequent scenarios.

(b) The Reallocation Process Runs with Interruption while Identifying Source Node Data Elements In this scenario, the reallocation process begins and is working on identifying LFU data elements from a source node when the load balancer receives a request for an edit operation, for example a write or a delete, on the source node. It should be noted that a read request will not impact reallocation, and the reallocation process can proceed as is. However when an edit operation is received, the reallocation process pauses and waits for the load balancer request to finish. After the request is completed, the reallocation process reassesses the load on the source node and the target node(s) before further processing. It is possible that upon reassessing, no reallocation is required, as the load balancer may have moved data around.

(c) The Reallocation Process Runs with Interruption while Transferring Identified Source Node Data Elements In this scenario, the reallocation process is interrupted by the load balancer after it has identified the source data elements and is in the process of reallocating them to the target node. The reallocation process again pauses for the load balancer to finish and then reassesses the load on the source node and the target node(s) before proceeding ahead with processing the transferring.

(d) The Reallocation Process Runs with Interruption while Deleting Source Node Data Elements In this scenario, the reallocation process has copied the identified source node data elements to the target node, but the data elements have not been deleted from the source node. Nevertheless, the reallocation process can still proceed when the load balancer request is received. That is to say, deletion of the source node elements can continue as no application is requesting these elements. Further, deletions occurring in parallel with the load balancer request have minimal effect as the reallocation process runs at a lower priority than the load balancer.

V. Implementation

Examples of implementation details for the various ways load reallocation works are now provided. It should again be noted that the implementation is intended to be conducted such that existing processing related to client applications are not impacted. The reallocation process in this example can start up when the IMDM cluster is initiated. It can run in the background and depending on the configurations, it can be triggered to reallocate the data elements across the nodes. Reallocation may work closely with and/or use the load balancer to get the current state of the nodes in the cluster, and then can start the reallocation process. It can create a copy of data elements from one node to the other by copying the memory references, and it can request the load balancer to route requests to the new node before unloading (deleting) the data elements that originally had the load. This process may be implemented so as to have negligible impact on client applications looking for data, although for a short period of time it may result in multiple copies of the same data elements existing on the cluster.

The implementation steps in the reallocation process can include the following:

A. Getting Current State of Nodes

The current state of the cluster is obtained, for example, from the load balancer which returns an array of node information for nodes within the cluster, as shown in the example pseudo code below.

NodeInfo[ ] Loadbalancer.getCurrentState( )

This can be used to identify the source and the target node(s) by running operations on the NodeInfo object.

For example, to obtain total capacity for a specific node, the following pseudo code can be implemented:

NodeInfo[1].getTotalCapacity( );

To get current capacity for a specific node, the following pseudo code can be implemented:

NodeInfo[1].getCurrentCapacity( ):

The source node can be identified if any of the defined criteria is met. A target node can be identified by comparing total capacity of the node with current capacity of the node. Each reallocation can be an atomic transaction. Thus, if after reallocation a target node meets the criteria and requires another reallocation, this would be a separate transaction. However at any given point, target nodes can be identified by comparing current capacity with total capacity of the node. A reallocation process can call these application programming interfaces (APIs) multiple times as part of a single reallocation, which may happen often as this might get interrupted during the reallocation. These APIs can be called multiple times to assure that the state of the nodes has not changed and processing can continue.

B. Copying Data Elements

The copying of data elements is from a source node with a heavier load to a target node with a lighter load where the first parameter specifies the node with the heavier load and the second node is the lightly loaded node. Meta data for all data elements can be checked before copying them, to skip unnecessary copying of data elements. For example if metadata for a data element indicates that it is due to expire shortly, it does not make sense to copy the data element. The copying function may also notify the load balancer after the copy has been created. This functionality can be found in the following example pseudo code:

Copy(node1, node 3, dataelements)

The copy operation can run while ensuring that there are no new requests for edit operations (e.g., write or delete) from the load balancer. If there are new requests for edit operations, the reallocation process may use the logic defined above to pause processing. Pausing can include functionality so that when the copy operation restarts again, it checks if it can still move forward with the original operation. If the change while paused on the source and the target nodes requires the reallocation to be canceled, then the reallocation process can restart completely from scratch or otherwise can proceed as planned. The copy process implementation can work by getting free memory references from the target node to copy the source data elements.

C. Deleting Data Elements from the Loaded Node

Deleting can be performed after the requests coming from the client applications have been processed so as to avoid any impact. The delete function can be implemented as in the following pseudo code:

Delete(node1, dataelements)

The reallocation process can be designed to look at internals of each data element by reviewing one or more of the expiry time, most recently used time, frequency of use, and the like, before deciding to move a specific data element. This intelligence can make the process more efficient as it is more aware of the characteristics of the data versus treating every data element the same way.

Turning back to what occurs before the reallocation process, the implementation of the six criteria for beginning the reallocation process is now discussed.

1. Data Amount Threshold

The data threshold when at the cluster level can be stored, for example in the "clusterconfig.xml" file. The data threshold conveniently can be represented in GB. The setting of the cluster threshold at 500 GB can be as follows:

Clusterdatathreshold=500

The reallocation process is designed to look for this property at the cluster level. As with many allocation start thresholds, the property is optional so may not exist all the time. The data threshold at the node level can have a similar setting stored in association with different nodes, for example, in the "nodeconfig.xml." This can allow allows each node to have a different data threshold in order for reallocation to begin. This property at the node level can also be optional, and all numbers conveniently can be represented in GB, such as a node threshold at 100 GB:

Nodedatathreshold=100

2. Time Threshold

The time threshold at the cluster level can be stored, for example, in the "clusterconfig.xml" file. The time threshold conveniently can be represented in seconds. The setting for 36,000 seconds can be as follows:

Clustertimethreshold=36000

The reallocation process can be designed to look for this property at the cluster level. This property can be optional so may not exist all the time. The node level can have a similar setting stored in association with different nodes, for example in the "nodeconfig.xml." This can allow each node to have a different time threshold before reallocation starts. This property at the node level can be optional and all numbers conveniently can be represented in seconds, such as:

Nodetimethreshold=3600

3. Number of Elements Threshold

The number of elements threshold at the cluster level can be stored, for example, in the "clusterconfig.xml" file. The number of elements threshold can be represented in an element count, such as a threshold of 10,000 total elements within the cluster:

Clusternoethreshold=10000

The reallocation process can be designed to look for this property at the cluster level. This property can be optional so may not exist all the time. The node level may have a similar setting which is stored, for example in the "nodeconfig.xml" file. This allows each node to have a different threshold to start reallocating. This property also can be optional and all numbers conveniently can be represented as an element count, such as a threshold of 1,000 total elements within the node:

Nodenoethreshold=1000

For all the above criteria, including data amount, time, and number of elements, the reallocation process can be designed to check for the property. If the property exists both at the cluster-level and the node-level, then the node level can overwrite the property set at the cluster level. When the property is only set at the cluster level, then the reallocation process can continue to work closely with the load balancer and/or to utilize load balancer information to get the current state of all the nodes in the cluster and then the reallocation process can trigger based on the criteria, that is, based on the current state obtained from the load balancer vs. the property(ies). If the property is set only at the node level, then the reallocation process can get the state of the node from that specific node directly and can the reallocation process can trigger based on defined criteria and the state of the node obtained from the specific node.

The reallocation process can maintain a map, conveniently internal to the reallocation process, which can keep track of criteria at the node level. Table 1 below is an example of such a map. This map can be continuously compared (for example, on a periodic basis) against the current state of the nodes before the reallocation is triggered.

TABLE 1

| Node   | Data | Time   | Number of Elements |
|--------|------|--------|--------------------|
| Node 1 | 120  |        |                    |
| Node 2 |      | 600    |                    |
| Node 3 | 50   |        | 2000               |
| Node 4 |      | 360000 | 100000             |

4. Addition or Removal of a Node from the Cluster

This criteria relates of course to two different events, and can be very different from the other criteria. Addition of a node introduces more capacity into the cluster. The load balancer can start assigning capacity when a node is added, but the reallocation process can actually move data elements from heavily loaded nodes to the newly added node. The intention behind reallocation is improving the overall latency for the cluster.

Removal of a node, whether intentional or unintentional such as due to a crash, results in reduced capacity. If the removal is intentional, there should be no data loss so reallocating can be easier as it reshuffles the data onto existing nodes to avoid impacts to the quality of service. However, if the removal is due to a crash then it can be important to determine the node(s) that should get the lost data. This can be done for example by either coordinating with the recovery process by reading from disk, or by working with the client applications to distribute the data to the lightly loaded nodes. In these scenarios, it is highly likely that the reallocation process will need to be extended to work with the client application(s) or the recovery process.

5. Manual Trigger

This criteria of course involves a manual triggering of the reallocation process, for example by receiving a reallocation command from an administrative or management console for the IMDM system. As discussed above, an appropriately authorized user, such as an administrator for the system, can initiate this reallocation of the data elements across the different nodes in the cluster.

6. Predictive Reallocation

Figure 4:
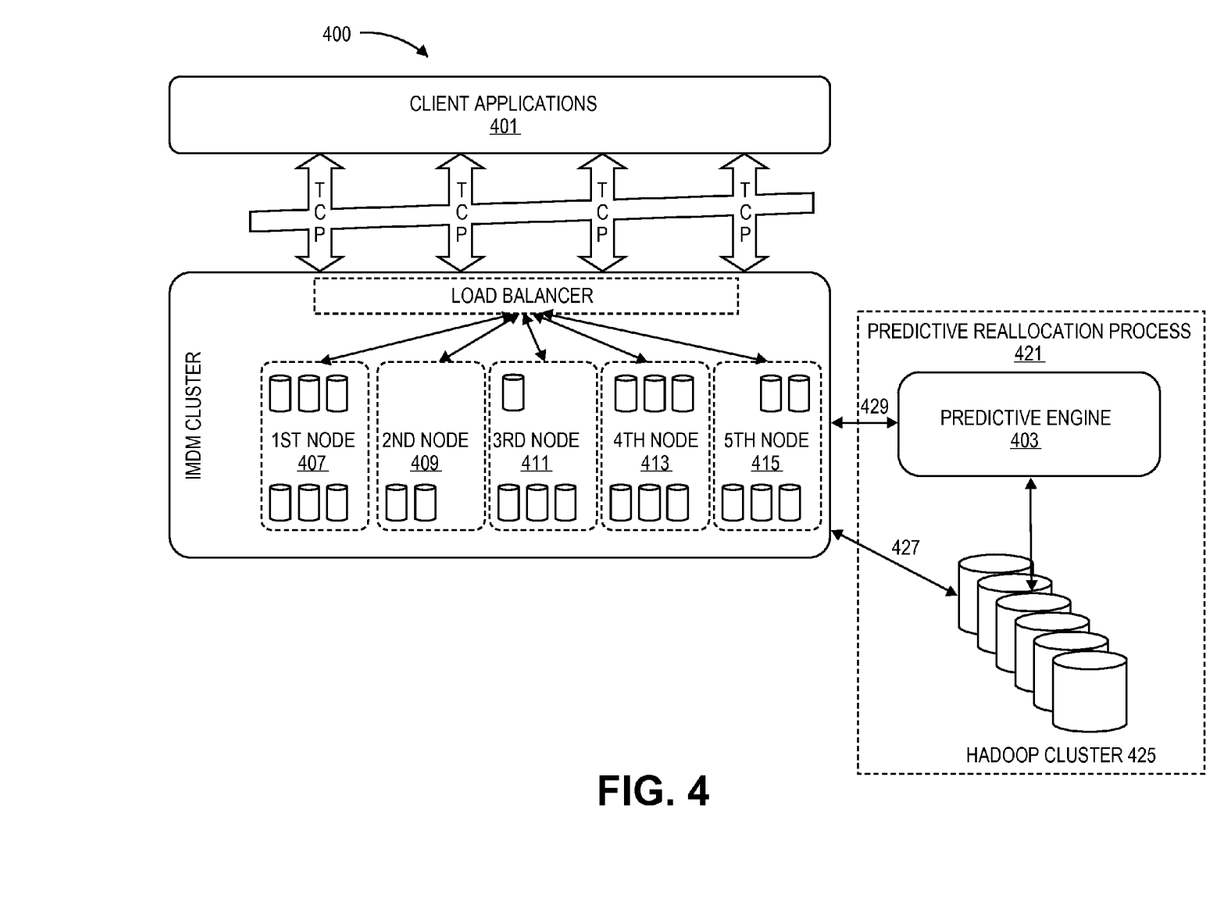
FIG. 4 is a diagram illustrating use of predictive allocation in an IMDM system.

FIG. 4 illustrates use of a predictive allocation process 421 in an IMDM system 400. Predictive reallocation may desirably interact with historical data that is stored in a Hadoop cluster 425. (The cluster is not limited to a cluster in a Hadoop file system, which is mentioned as a convenient example of a Big Data distributed data storage and processing system which recognizes nodes and clusters, of which other implementations are known and may be used.) The Hadoop cluster 425 uses the standard input and output connectors 427 from an in-memory cluster 417 (which includes representative nodes 407, 409, 411, 413, 415, although there may be more or fewer nodes than illustrated) to move data in and out of a Hadoop Distributed File System (HDFS). A predictive engine 423 with a predictive model can sit on top of the cluster 425 to initially build the predictive model, and over time, refine the predictive model. Streaming data from the load balancer 405 can be fed 429 into the predictive engine 423 to help it make decisions related to starting the reallocation process 421.

Figure 5:
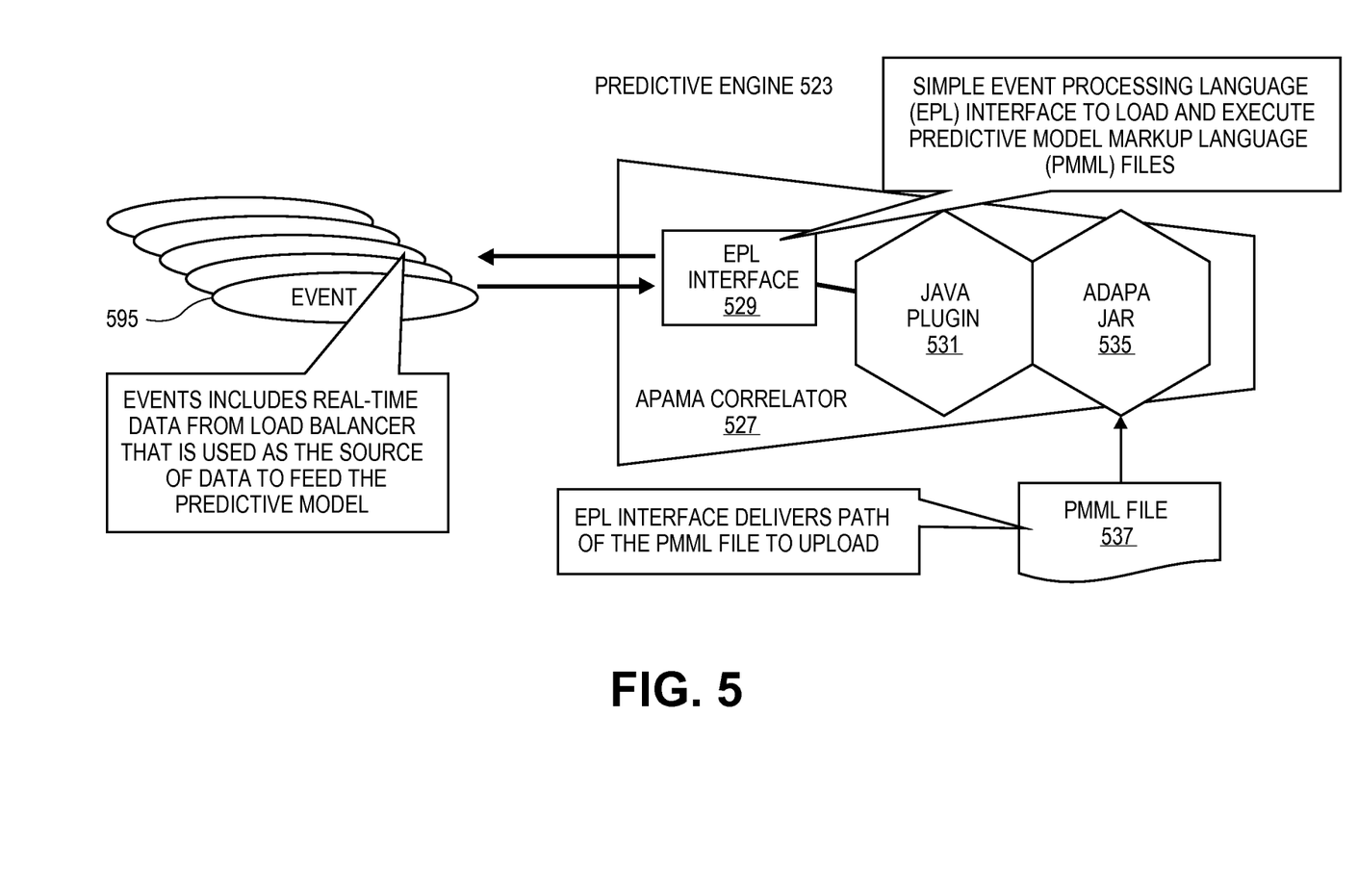
FIG. 5 is a diagram illustrating a predictive engine with an analytics correlator in use.

FIG. 5 illustrates a predictive engine 523 with an analytics correlator 527 in use. The predictive engine 523 may be built using a streaming analytics correlator, one example of which is Apama 527 by Software AG. Apama may further work with, for example Adaptive Decision and Predictive Analytics (ADAPA) APIs designed by Zementis, to load and utilize predictive models in real-time.

FIG. 5 shows that the events 525 include real-time data, received from a load balancer, which can be used as a source of data to feed the predictive engine. Apama 527 uses a simple Event Processing Language (EPL) interface 529 to input event data and output results and other data. The EPL interface 529 loads and executes Predictive Model Markup Language (PMML) files along with event information for processing by a JAVA Plugin 531 and an ADAPA Jar 535.

In particular, the EPL interface 529 provides a path for uploading of the PMML file 537. After processing by the JAVA Plugin 531 and the ADAPA Jar 535, the APAMA correlator 527 can maintain data as to the effects of particular events 525. On certain events occurring, the APAMA correlator 527 may provide instructions to begin reallocation based on these triggering events.

It should be noted that streaming events provided from the load balancer can be sent to using a language such as XML. The events may have the following structure, which is provided by way of example to illustrate an appropriate event format which may be adapted as desired:

```
<request>
    <name> put('user1', userobject)</name>
    <TargetNode> Node2</TargetNode>
</request>
<cache-name>
    <node 1>
        <data>140</data>
        <noofelements>8400</noofelements>
    </node1>
    <node 2>
        <data>110</data>
        <noofelements>7100</noofelements>
    </node2>
    ...
</cache-name>
```

The reallocation process already knows the available capacity, and it can use the above real-time information in the Apama correlator along with historical data in the Hadoop cluster to determine when reallocation is be done. The request section can be used to define patterns within the predictive model. As an example, if the historical data shows a sequence of events occurring before a large load is put in-memory and the last call is usually a 'put' for the user object, then the predictive model can learn from that, and predict the state to run a preemptive reallocation process. As the historical data grows, the accuracy of the predictive model will increase and the timing of the reallocation process is improved.

Another example would be to build a model for an eCommerce environment where the predictive model looks at the put(userKey) request, and knows that a large data load is imminent within the next few seconds as the user might place an order. This may cause running of a preemptive reallocation process. As the model becomes more intelligent, it may identify characteristics of a particular user, like the average order data size, which will pre-determine the space that needs to be freed up to keep that order in memory, thus preemptively running the reallocation process.

It may be noted that the ADAPA APIs designed by Zementis can enable the functionality described above as they have built in capability to work with a predictive model, however, the techniques described herein may be adapted to other APIs or similar. ADAPA predictive analytics engine supports the REST standard so they can connect to any URL.

The predictive reallocation approach can be more expensive than other thresholds. Thus, in operation, it is thought that the predictive reallocation approach may be best suited for larger deployments dealing with at least hundreds of terabytes of data to justify the setup costs. Though expensive, predictive reallocation can be most accurate and beneficial with its ability to preemptively reallocate the data elements in the system.

D. IMDM System Example

Figure 6:
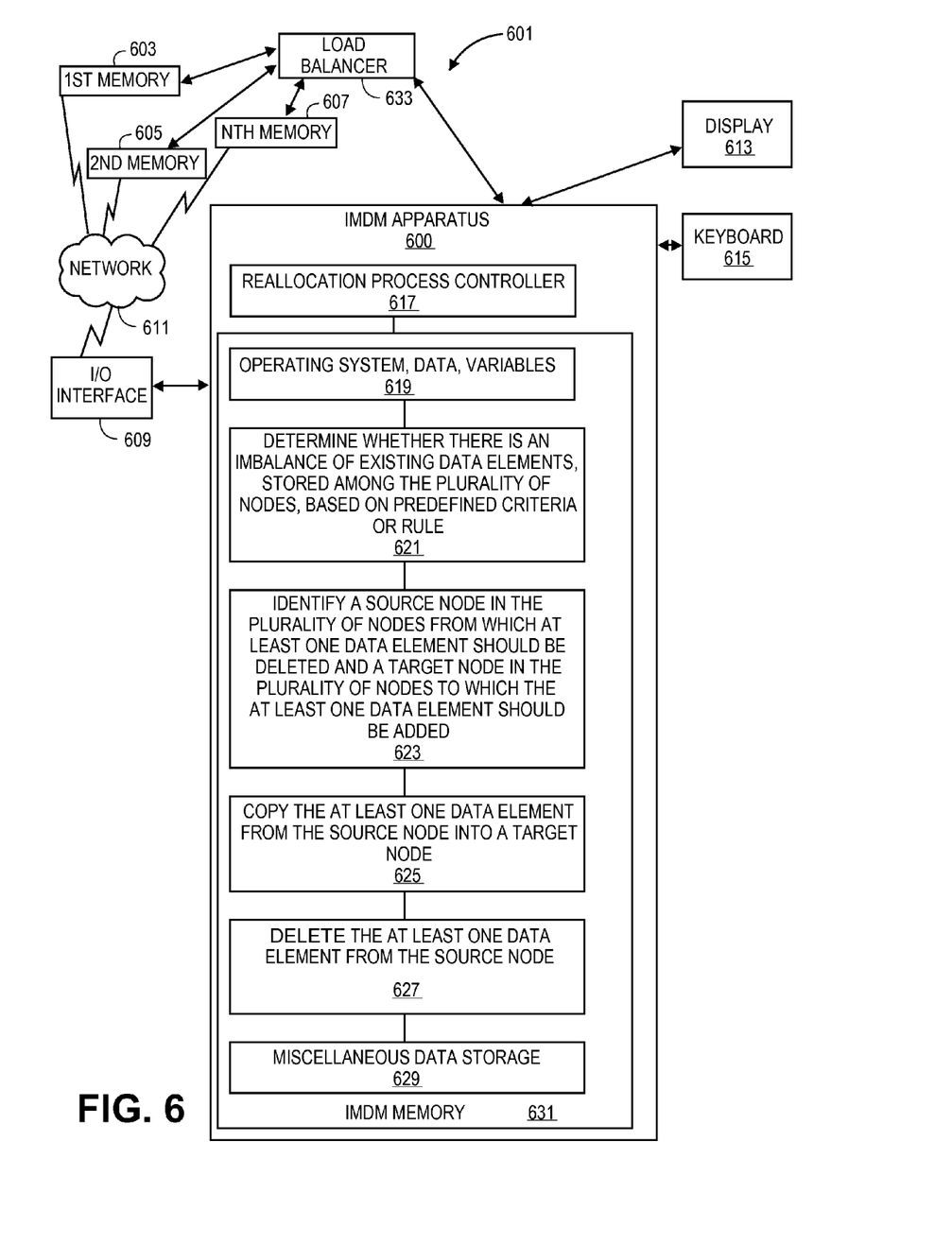
FIG. 6 is a block diagram illustrating an IMDM apparatus in an IMDM system that implements a reallocation process.

Reference is now made to FIG. 6, which is a block diagram illustrating an IMDM apparatus 600 in an IMDM system 601 that implements a reallocation process. The IMDM apparatus 600 may include a reallocation process controller 617, an input/output (I/O) interface 609 for communication such as over a network 611, IMDM memory 631, a display 613, and a user input device such as a keyboard 615. Alternatively, or in addition to the keyboard 615, a user input device may comprise one or more of various known input devices, such as a keypad, a computer mouse, a touchpad, a touch screen, a trackball, and/or a keyboard. The display 613 may present information to the user by way of a conventional liquid crystal display (LCD) or other visual display, and/or by way of a conventional audible device (for example, a speaker) for playing out audible messages. Portions of the IMDM apparatus 600 are well understood to those of skill in this area and have been omitted to avoid obscuring the discussion.

The IMDM apparatus 600 is connected, through the network 611 to various memory locations represented in this illustration by a first memory location 603, a second memory location 605, and an Nth memory location 607. The memory locations 603, 605, 607 provide a plurality of nodes as discussed herein that form an IMDM grid/cluster. That is to say, the memory locations 603, 605, 607 collectively form an IMDM cluster in which a plurality of data elements (not shown) can be stored. The memory locations 603, 605, 607 are considered to provide "in-memory" access to the reallocation processor controller 617. The memory locations 603, 605, 607 are in part controlled by the load balancer 633 (which is connected with both the IMDM apparatus 600 and the memory locations 603, 605, 607) which provides an initial distribution of the data elements stored in the plurality of nodes formed by the memory locations 603, 605, 607, according to known techniques.

Although the memory locations 603, 605, 607 appear in FIG. 6 to be disposed as physically separate, this is not necessarily the case. The illustrated configuration is simply exemplary. The memory locations that form the plurality of nodes may be disposed virtually or physically on a single machine or on a plurality of machines. Also, although illustrated as being connected over the network 611, the memory locations 603, 605, 607 may be disposed as completely within the IMDM apparatus 600 itself. Succinctly put, the memory locations 603, 605, 607 may be provided in many different any configuration to provide "in-memory" access to the reallocation process controller 617.

The reallocation process controller 617 may comprise one or more microprocessors and/or one or more digital signal processors. The IMDM memory 631 may be coupled to the reallocation process controller 617 and may comprise a read-only memory (ROM), a random-access memory (RAM), a programmable ROM (PROM), and/or an electrically erasable read-only memory (EEPROM). The IMDM memory 631 may include multiple memory locations for storing, among other things, an operating system, data and variables 619 for programs executed by the controller 617. The programs may cause the controller 617 to operate in connection with various functions. It should be noted that the IMDM memory 631 may be dedicated for use with the reallocation process controller 617 rather than for data element storage as "in-memory" access.

A first program 621 may cause the reallocation process controller 617 to determine whether there is an actionable load imbalance of existing data elements, stored among the plurality of nodes included in the IMDM cluster 603, 605, 607 based on a predefined criteria or rule. Thus for example, when an amount of data used in each node exceeds a particular threshold or actionable amount, the reallocation process begins. Other thresholds or actionable quantities include an expiration of time from a starting point and a number of data elements stored in each node. Other triggering or actionable events include an occurrence of a node being added or removed from the IMDM cluster 603, 605, 607, an occurrence of a request from a client application that has been determined to be a trigger by a predictive-learning function, and an occurrence of a manual trigger.

When the result of the first program 621 is a determination that there is an actionable load imbalance of existing data elements, other programs cause the reallocation process controller 617 to perform in a particular manner, including performing a reallocation cycle. Specifically, a second program 623 may cause the reallocation process controller 617 to identify in the plurality of nodes, a source node, from which at least one data element is to be deleted, and a target node, into which the at least one data element that is to be deleted, is to be added. In the second program 621, the source node and target node contribute, at least in-part, to the actionable load imbalance of existing data elements.

In the second program 623, the source node may be identified according to the predefined criteria or rule used to determine whether there is an actionable load imbalance of existing data elements. The target node may be identified based on its current load and total capacity as obtained by the load balancer 633.

A third program 625 may cause the reallocation process controller 617 to copy the at least one data element that is to be deleted from the source node into the target node. A fourth program 627 may cause the reallocation process controller 617 to delete the at least one data element that is to be deleted from the source node. The at least one data element that is to be deleted may include only data elements with an auto-expiration date that is imminent. Of course whether something is "imminent" is decided according to a predetermined standard for imminence (such as in "IgnoreElementsWithExpiryTime" described above).

Responsive to manual signaling from the user input device represented by the keyboard 615, or in accordance with instructions stored in the IMDM memory 631, and/or automatically upon receipt of certain information via the I/O interface 609, the controller 617 may direct the execution of the stored programs 621, 623, 625, 627.

The IMDM apparatus 600 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the IMDM apparatus 600 used in conjunction with the processes described herein. The IMDM apparatus 600 may also include a CD ROM reader and CD recorder, which may be interconnected by a bus along with other peripheral devices which may be included and which may be supported by the bus structure and protocol (not illustrated). The bus can serve as the main information highway interconnecting other components of the IMDM apparatus 600, and can be connected via an interface to the IMDM apparatus 600. A disk controller (not illustrated) can interface disk drives to the system bus. These may be internal or external. The reallocation process controller 617, IMDM memory 631, a disk drive and/or removable storage medium may be referred to as "computer-readable storage media" and provide non-transitory storage of computer programs and data.

As indicated above, FIG. 6 should be understood to describe components in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

E. IMDM Flow

Figure 7:
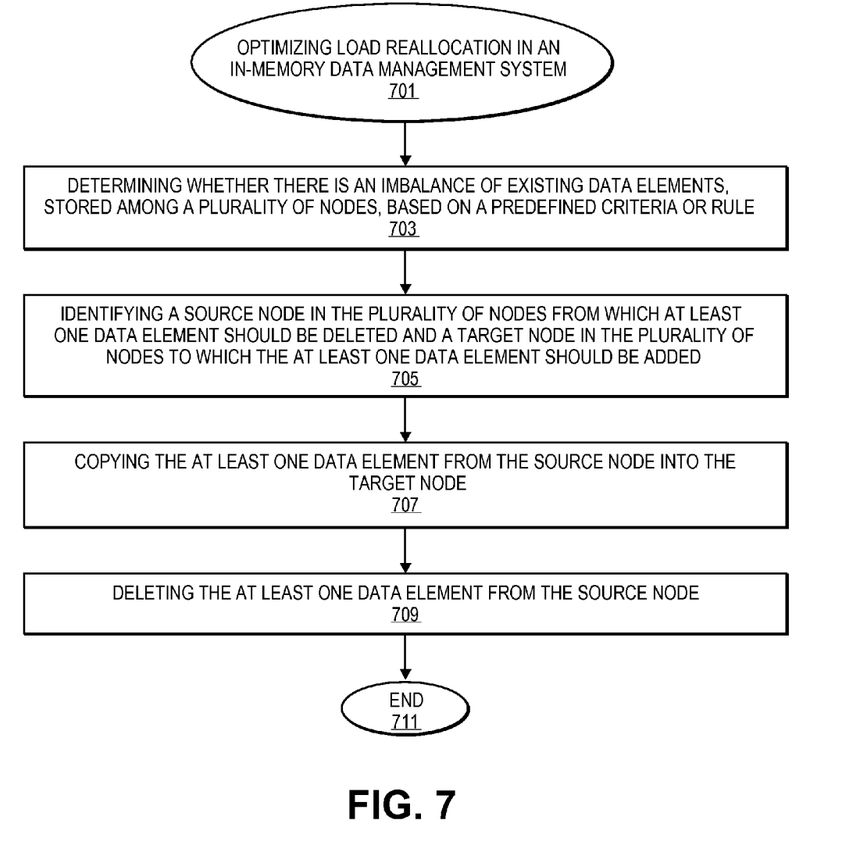
FIG. 7 is block diagram illustrating steps in a process for optimizing load reallocation in an in-memory data management system.

FIG. 7 provides a block diagram illustrating steps in a process 701 for optimizing load reallocation in an in-memory data management system. Most of the details implicated by FIG. 7 have been discussed above, and are not repeated herein. However, FIG. 7 is useful to illustrate the procedure and provide a more complete understanding. The process 701 of FIG. 7 may be advantageously implemented on the IMDM apparatus 600 of FIG. 6, or other apparatus appropriately configured.

The first step 703 is determining whether there is an imbalance of existing data elements, stored among a plurality of nodes, based on a predefined criteria or rule. The second step 705 is identifying a source node in the plurality of nodes from which at least one data element should be deleted and a target node in the plurality of nodes to which the at least one data element should be added. The third step 707 is copying the at least one data element from the source node into the target node. The fourth step 709 is deleting the at least one data element from the source node. The process then ends 711 or may be repeated (not shown).

VI. Glossary

Terms as used herein are intended to be interpreted at a first level as understood to one of skill in the art of in-memory data management; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The expressions "in-memory data grid", "in-memory data management grid", or "IMDG" as used herein refers to a data structure that resides entirely in random access memory (RAM), and is distributed on a single server or among multiple servers.

The expression "in-memory data management system" or "IMDM system" or "in-memory data management cluster" or "IMDM cluster" as used herein refers to a single apparatus or multiple apparatuses that physically support an IMDG and that contain components for controlling and/or operating an IMDG.

The term "cluster" as used herein refers to a set of loosely connected or tightly connected computers that work together so that they may be viewed, in many respects, as a single system.

The term "node" as used herein refers to a single instance of a server that is used for an application. This can be setup on a virtualized server or a dedicated server.

The expression "data element" as user herein refers to a root level piece of information that is stored in a node.

The expression "load balancer" indicates a process of, or an apparatus that implements a process of, distributing new data elements to nodes that comprise an IMDG in a manner that seeks to achieve an equitable distribution of the new data elements. Various load balancers are known.

VII. Implementations and Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for optimizing load reallocation in an in-memory data management system have been discussed in detail above. It should be further noted that the above-described processes can be stored as instructions in a computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An in-memory data management (IMDM) system comprising:
    an IMDM cluster including a plurality of nodes;
    a load balancer; and
    a reallocation process controller, cooperatively operable with the IMDM cluster and the load balancer, and programmed to perform a reallocation cycle including:
        determining whether there is an actionable load imbalance of existing data elements, stored among the plurality of nodes included in the IMDM cluster, based on a predefined criteria or rule; and
        when it is determined that there is an actionable load imbalance of existing data elements:
            identifying in the plurality of nodes, a source node, from which at least one data element is to be deleted, and a target node, into which the at least one data element that is to be deleted, is to be added, the source node and target node at least in-part contributing to the actionable load imbalance of existing data elements;
            copying the at least one data element that is to be deleted from the source node into the target node; and
            deleting the at least one data element that is to be deleted from the source node, wherein
    when, after the reallocation process controller identifies the source node and the target node but before the reallocation process controller copies the at least one data element, the load balancer receives a write request from a client application:
        the reallocation process controller pauses operation;
        the load balancer executes the write request; and
        the reallocation process controller restarts the reallocation cycle.

2. The IMDM system according to claim 1, wherein the predefined criteria or rule used to determine whether there is an actionable load imbalance of existing data elements includes at least one of:
    an amount of data used in the plurality of nodes,
    an expiration of time from a starting point,
    a number of data elements stored in the plurality of nodes,
    an occurrence of a node being added or removed from the IMDM cluster,
    an occurrence of a request from a client application that has been determined to be a trigger by a predictive-learning function, and
    an occurrence of a manual trigger.

3. The IMDM system according to claim 1, wherein the at least one data element includes only data elements with an auto-expiration date determined, in part by the load balancer, to be not imminent according to a predetermined standard for imminence.

4. The IMDM system according to claim 3, wherein the at least one data element includes only data elements that are a least recently used data element or a least frequently used data element in their respective nodes.

5. An in-memory data management (IMDM) system comprising:
    an IMDM cluster including a plurality of nodes;
    a load balancer; and
    a reallocation process controller, cooperatively operable with the IMDM cluster and the load balancer, and programmed to perform a reallocation cycle including:
        determining whether there is an actionable load imbalance of existing data elements, stored among the plurality of nodes included in the IMDM cluster, based on a predefined criteria or rule; and
        when it is determined that there is an actionable load imbalance of existing data elements:
            identifying in the plurality of nodes, a source node, from which at least one data element is to be deleted, and a target node, into which the at least one data element that is to be deleted, is to be added, the source node and target node at least in-part contributing to the actionable load imbalance of existing data elements;
            copying the at least one data element that is to be deleted from the source node into the target node; and
            deleting the at least one data element that is to be deleted from the source node, wherein
    when, after the reallocation process controller identifies the source node and the target node and after the reallocation process controller copies the at least one data element, the load balancer receives a request from a client application:
        the reallocation process controller pauses operation; and
        the reallocation process controller restarts the reallocation cycle.

6. The IMDM system according to claim 5, wherein the predefined criteria or rule used to determine whether there is an actionable load imbalance of existing data elements includes at least one of:
    an amount of data used in the plurality of nodes,
    an expiration of time from a starting point,
    a number of data elements stored in the plurality of nodes, an occurrence of a node being added or removed from the IMDM cluster, an occurrence of a request from a client application that has been determined to be a trigger by a predictive-learning function, and an occurrence of a manual trigger.

7. The IMDM system according to claim 5, wherein the at least one data element includes only data elements with an auto-expiration date determined, in part by the load balancer, to be not imminent according to a predetermined standard for imminence.

8. The IMDM system according to claim 7, wherein the at least one data element includes only data elements that are a least recently used data element or a least frequently used data element in their respective nodes.

9. A method, implemented in an in-memory data management (IMDM) system, comprising an IMDM cluster including a plurality of nodes, a load balancer, and a reallocation process controller, cooperatively operable with the IMDM cluster and the load balancer, comprising performing, by the reallocation process controller, a reallocation cycle, including:

determining whether there is an actionable load imbalance of existing data elements, stored among the plurality of nodes included in the IMDM cluster, based on a predefined criteria or rule; and when it is determined that there is an actionable load imbalance of existing data elements:

identifying in the plurality of nodes, a source node, from which at least one data element is to be deleted, and a target node, into which the at least one data element that is to be deleted, is to be added, the source node and target node at least in-part contributing to the actionable load imbalance of existing data elements;

copying the at least one data element that is to be deleted from the source node into the target node; and deleting the at least one data element that is to be deleted from the source node; and when, after the source node and the target node are identified and before the at least one data element is copied, the load balancer receives a write request from a client application:

pausing operation by the reallocation process controller;

executing the write request by the load balancer; and restarting performing of the reallocation cycle by the reallocation process controller.

10. The method according to claim 9, wherein the predefined criteria or rule used in determining whether there is an actionable load imbalance of existing data elements includes at least one of:

an amount of data used in the plurality of nodes, an expiration of time from a starting point, a number of data elements stored in the plurality of nodes, an occurrence of a node being added or removed from the IMDM cluster, an occurrence of a request from a client application that has been determined to be a trigger by a predictive-learning function, and an occurrence of a manual trigger.

11. The method according to claim 9, wherein the at least one data element includes only data elements with an auto-expiration date determined, in part by the load balancer, to be not imminent according to a predetermined standard for imminence.

12. A method, implemented in an in-memory data management (IMDM) system, comprising an IMDM cluster including a plurality of nodes, a load balancer, and a reallocation process controller, cooperatively operable with the IMDM cluster and the load balancer, comprising performing, by the reallocation process controller, a reallocation cycle, including:

determining whether there is an actionable load imbalance of existing data elements, stored among the plurality of nodes included in the IMDM cluster, based on a predefined criteria or rule; and when it is determined that there is an actionable load imbalance of existing data elements:

identifying in the plurality of nodes, a source node, from which at least one data element is to be deleted, and a target node, into which the at least one data element that is to be deleted, is to be added, the source node and target node at least in-part contributing to the actionable load imbalance of existing data elements;

copying the at least one data element that is to be deleted from the source node into the target node; and deleting the at least one data element that is to be deleted from the source node; and when, after the source node and the target node are identified and after the at least one data element is copied, the load balancer receives a request from a client application:

pausing operation by the reallocation process controller;

executing the request by the load balancer; and restarting performing of the reallocation cycle by the reallocation process controller.

13. The method according to claim 12, wherein the predefined criteria or rule used in determining whether there is an actionable load imbalance of existing data elements includes at least one of:

an amount of data used in the plurality of nodes, an expiration of time from a starting point, a number of data elements stored in the plurality of nodes, an occurrence of a node being added or removed from the IMDM cluster, an occurrence of a request from a client application that has been determined to be a trigger by a predictive-learning function, and an occurrence of a manual trigger.

14. The method according to claim 12, wherein the at least one data element includes only data elements with an auto-expiration date determined, in part by the load balancer, to be not imminent according to a predetermined standard for imminence.

15. A non-transitory computer-readable storage medium with instructions stored thereon, which when executed in part by a reallocation process controller, which is cooperatively operable with an in-memory data management (IMDM) cluster, including a plurality of nodes, and a load balancer, in an IMDM system, results in a method being performed, the method comprising performing a reallocation cycle, including:

determining whether there is an actionable load imbalance of existing data elements, stored among the plurality of nodes included in the IMDM cluster, based on a predefined criteria or rule; and when it is determined that there is an actionable load imbalance of existing data elements:
identifying in the plurality of nodes, a source node, from which at least one data element is to be deleted, and a target node, into which the at least one data element that is to be deleted, is to be added, the source node and target node at least in-part contributing to the actionable load imbalance of existing data elements;
copying the at least one data element that is to be deleted from the source node into the target node; and
deleting the at least one data element that is to be deleted from the source node; and
when, after the source node and the target node are identified and before the at least one data element is copied, the load balancer receives a write request from a client application:
pausing operation of the reallocation process controller;
executing the write request by the load balancer; and
restarting performing of the reallocation cycle.

16. The computer-readable storage medium according to claim 15, wherein
the predefined criteria or rule used in determining whether there is an actionable load imbalance of existing data elements includes at least one of:
an amount of data used in the plurality of nodes,
an expiration of time from a starting point,
a number of data elements stored in the plurality of nodes,
an occurrence of a node being added or removed from the IMDM cluster,
an occurrence of a request from a client application that has been determined to be a trigger by a predictive-learning function, and
an occurrence of a manual trigger.

17. The computer-readable storage medium according to claim 15, wherein
the at least one data element includes only data elements with an auto-expiration date determined, in part by the load balancer, to be not imminent according to a predetermined standard for imminence.

18. A non-transitory computer-readable storage medium with instructions stored thereon, which when executed in part by a reallocation process controller, which is cooperatively operable with an in-memory data management (IMDM) cluster, including a plurality of nodes, and a load balancer, in an IMDM system, results in a method being performed, the method comprising performing a reallocation cycle, including:
determining whether there is an actionable load imbalance of existing data elements, stored among the plurality of nodes included in the IMDM cluster, based on a predefined criteria or rule; and
when it is determined that there is an actionable load imbalance of existing data elements:
identifying in the plurality of nodes, a source node, from which at least one data element is to be deleted, and a target node, into which the at least one data element that is to be deleted, is to be added, the source node and target node at least in-part contributing to the actionable load imbalance of existing data elements;
copying the at least one data element that is to be deleted from the source node into the target node; and
deleting the at least one data element that is to be deleted from the source node; and
when, after the source node and the target node are identified and after the at least one data element is copied, the load balancer receives a request from a client application:
pausing operation of the reallocation process controller;
executing the request by the load balancer; and
restarting performing of the reallocation cycle.

19. The computer-readable storage medium according to claim 18, wherein
the predefined criteria or rule used in determining whether there is an actionable load imbalance of existing data elements includes at least one of:
an amount of data used in the plurality of nodes,
an expiration of time from a starting point,
a number of data elements stored in the plurality of nodes,
an occurrence of a node being added or removed from the IMDM cluster,
an occurrence of a request from a client application that has been determined to be a trigger by a predictive-learning function, and
an occurrence of a manual trigger.

20. The computer-readable storage medium according to claim 18, wherein
the at least one data element includes only data elements with an auto-expiration date determined, in part by the load balancer, to be not imminent according to a predetermined standard for imminence.

* * * * *